Figure 1:
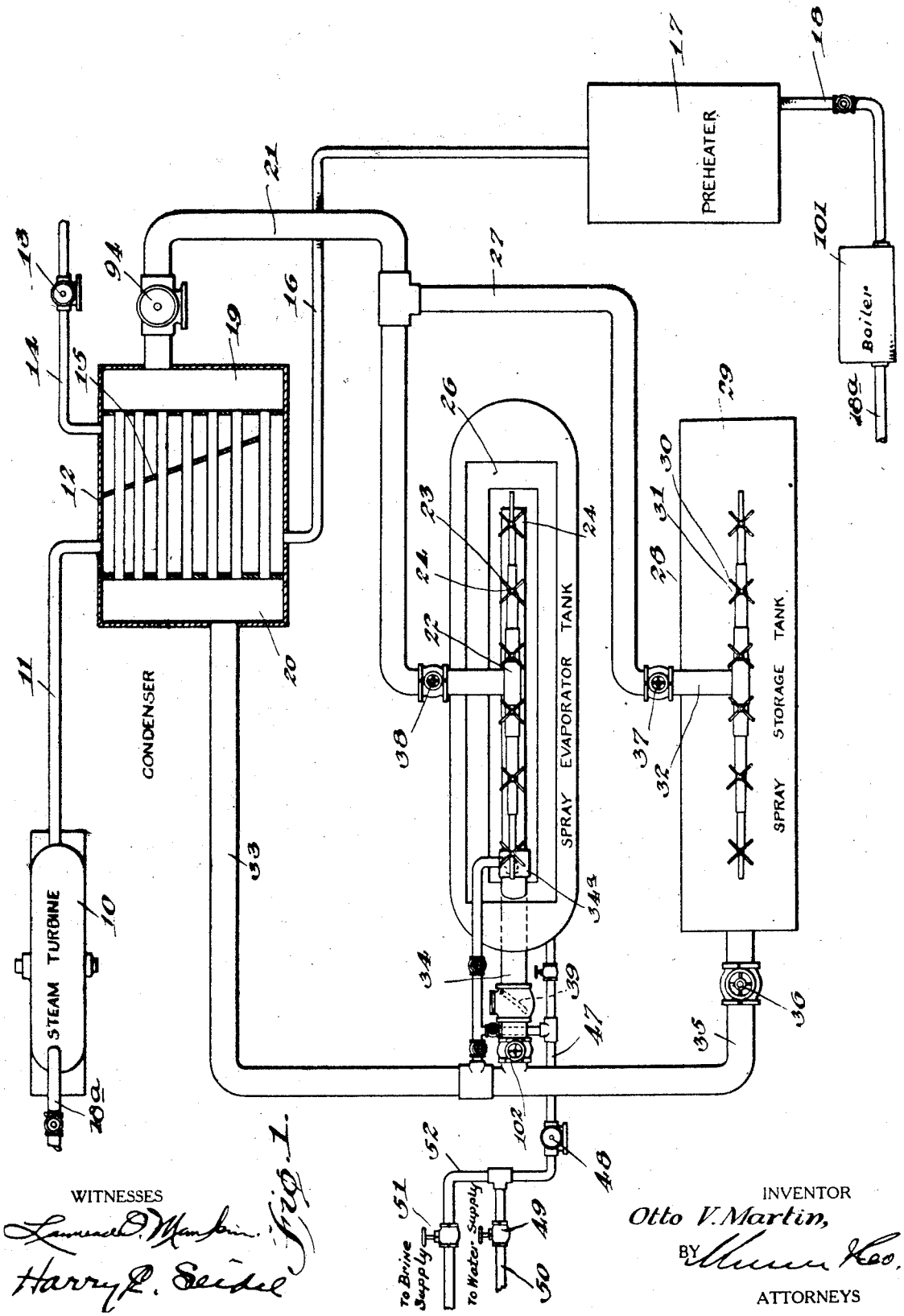

Jan. 31, 1928.  
O. V. MARTIN  
1,657,633  
PROCESS FOR THE PRODUCTION OF SALTS FROM BRINES AND SOLUTIONS  
Filed May 19, 1926  
4 Sheets-Sheet 3

WITNESSES  
Lawrence O. Mankin  
Harry E. Seidel

INVENTOR  
Otto V. Martin,  
BY Munn Rea  
ATTORNEYS

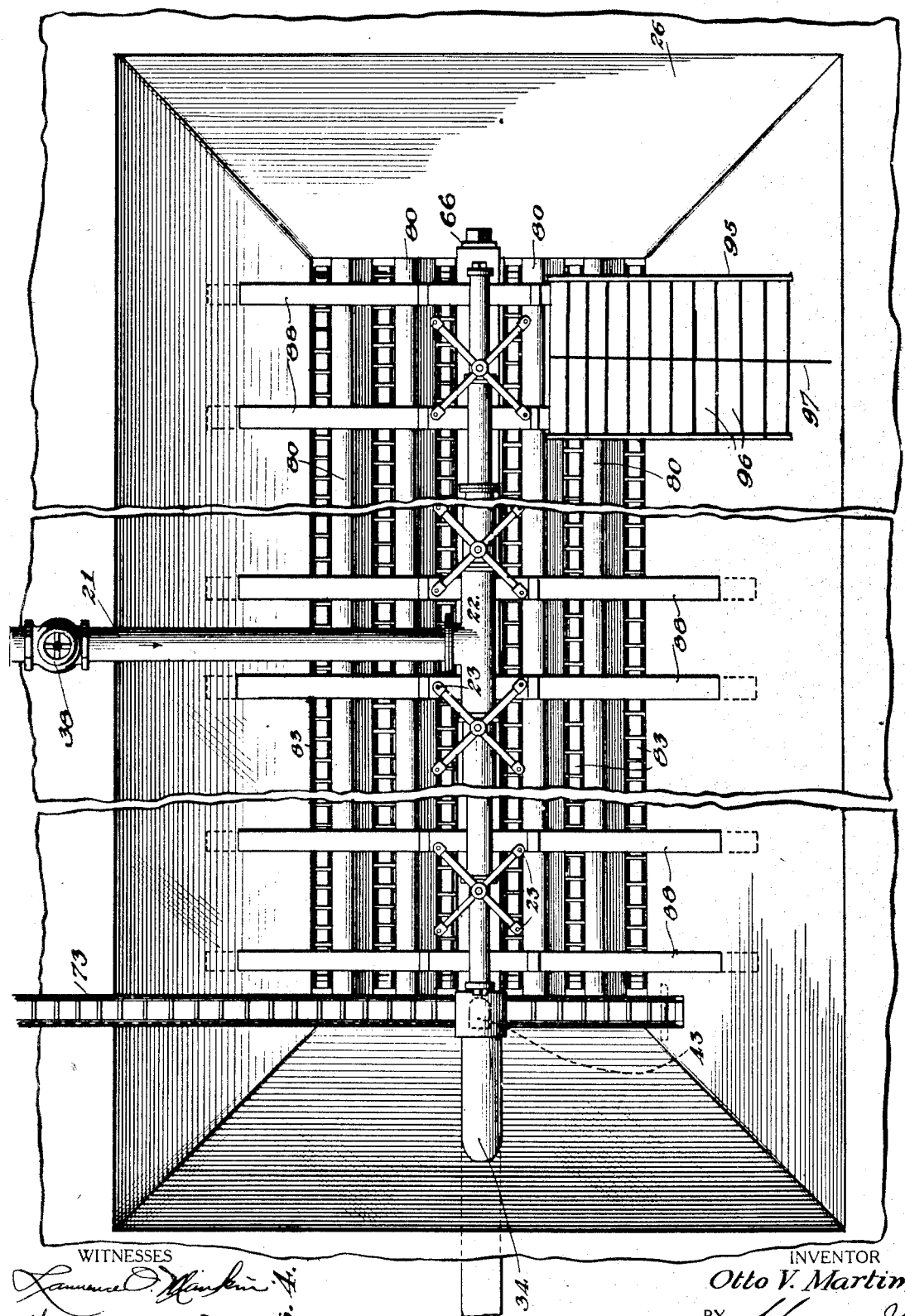

Patented Jan. 31, 1928.

1,657,633

UNITED STATES PATENT OFFICE.

OTTO V. MARTIN, OF SAND SPRINGS, OKLAHOMA, ASSIGNOR TO THE MARTIN-COLVIN CO., A CORPORATION OF ILLINOIS.

PROCESS FOR THE PRODUCTION OF SALTS FROM BRINES AND SOLUTIONS.

Application filed May 19, 1926. Serial No. 110,219.

This invention relates to a process and an apparatus for manufacturing salts from solution.

It has been proposed to evaporate brine in vacuum tanks and in which external heat is applied for causing vaporization of the brine under low pressures. It is necessary in such instance to produce steam for heating purposes and to require the use of a vacuum pump. While this method of recovering salts from brine is effective, nevertheless it is expensive.

It also has been proposed either to employ open air or solar pans for causing evaporation of the brine or salt solution or the salt solution has been sprayed above an open tank in a closed room in which the air is either at atmospheric temperature or heated above the same.

This process and apparatus provides an economical recovery of inorganic salts or organic salts or other materials which have either gone into solution or are suspended in solution inasmuch as it utilizes the heat units of exhaust turbine steam when the steam is condensed without appreciably lowering the temperature of the condensate.

In order to fully appreciate conditions under which the process is operated it will be necessary to set forth briefly the sequence of coordinated steps. In industrial plants the steam is passed through condensers cooled by running water which, in turn, is cooled by spray ponds in the open air. The latent heat freed in the condensation of the steam which is transmitted to the cooling water is dissipated to the atmosphere and this dissipated heat represents considerable loss in fuel to the plant. This is particularly true of plants in which steam turbines are employed for operating generators, the steam from such turbines being exhausted upon surface condensers upon which a high vacuum is drawn so that the pressure in the condenser is approximately zero absolute. In a plant where steam is generated and utilized in a vacuum turbine the water enters the boilers at approximately 80° F. This water is then converted into steam at a temperature approximately 370° F. (a pressure of about 190 lbs.). It requires one B. t. u. to raise 1 lb. of water 1° F., therefore it would require 290 B. t. u.'s to raise 1 lb. from 80° F. to 370° F. But in order to overcome the tendency of cohesion of the molecules and change the water to steam an additional 970 B. t. u.'s is required. From the boilers the steam is directed into a turbine where the expansion and decrease in pressure of this steam is used to operate the turbine. The steam passing through the turbine is then conducted through a surface condenser. A vacuum pump operating upon the condenser reduces the pressure in the final stage of the turbine to approximately 0° absolute scale. At this point water has a boiling temperature approximating 80° F.

By this mechanical arrangement I am enabled to regain most of the 290 B. t. u.'s from each pound of steam. The steam at this stage still contains the heat of vaporization (970 B. t. u.'s approximately per pound).

Under normal operating conditions about 100 lbs. of cooling water is circulated through the condenser for each pound of steam. This cooling water takes the heat of vaporization from the steam and converts it into water without appreciably changing its temperature. The cooling water is then conveyed through a spray system where the heat is dissipated while the condensed steam is returned through preheaters to the boiler for regeneration. In addition, the latent heat of vaporization is lost.

The present invention contemplates, in those plants which are so happily situated as to have crystalloid substances in solution in the cooling fluid, the utilization of the heat otherwise wasted in the cooling medium for the recovery of these substances in crystalline form, and in so doing the present invention proposes the practice of a method and apparatus different and more efficient than that employed in plants whose sole or main function is the recovery of crystalline solids.

In plants of the latter type where evaporation or crystallization is essential for the recovery of inorganic salts, organic compounds or finely divided materials in suspension in the liquid, vacuum evaporators are employed in which steam forms the heating element, and a vacuum is drawn so that the solutions boil at a low temperature. After the steam leaves the last stage of the vacuum unit it is passed through the surface condenser, the condensate giving up its heat of evaporation which is likewise dissipated. The solutions or brines produced in the evaporators are usually weak and in order to bring such solutions to their final state of concentration or dryness a great deal of time and expense is required.

It is an object of the present invention to utilize the latent heat of the steam at as near zero pressure absolute as it is possible to obtain without appreciably lowering the temperature of the condensate as said condensate passes thru a surface condenser, for raising the temperature of weak or saturated solutions used as the condensing medium to approximately the atmospheric temperature of the air for a particular locality so that when the heated solution is sprayed as a mist into the atmosphere the solutions will be evaporated rapidly and thus concentrated. The process is continuous and this is true whether the apparatus constructed according to the principles of the present invention is coordinated with a condenser of a steam turbine or a vacuum evaporator.

Another object of the invention is the provision of a process for recovering salts from solution and in which the brine is reduced to super-saturation by spraying brine which has received heat units from steam passing through a condenser and in which the brine is employed as a cooling liquid for the steam, the temperature of the brine being reduced by spraying to approximately the dew point so that moisture is removed between points where the mist is created and the level of solution in the tank with the subsequent concentration of the solution.

A further object of the invention is the provision of a continuous process for recovering salts from solution and in which the solution is passed through a surface condenser thereby utilizing the latent heat from the condensate to increase the temperature of the solution slightly above atmospheric temperature and converting the heated brine into a mist over a tank exposed to the atmosphere thereby reducing the temperature of the brine to approximately the dew point so that moisture is evaporated and the brine concentrated, then returning the concentrated brine to the condenser for absorbing heat units from the surface condenser while at the same time supplying a fresh charge of brine to the concentrated brine on its path through the condenser to not only maintain the normal level of the brine in the tank but for preventing formation of crystals along the path of the brine to said condenser.

A still further object of the invention is the provision of a process and apparatus for recovering salts from solutions in which the latent heat of a condensate passing through a condenser is utilized to increase the temperature of the solution slightly above atmospheric temperature without decreasing the temperture of the condensate appreciably below its boiling point, then converting the heated brine into a mist and exposing the same to the atmosphere, thereby reducing the temperature of the brine to approximately the dew point while controlling the extent of fall of the mist and varying the direction of its fall for regulating the size of the crystals which crytallize from the brine.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 shows more or less diagrammatically an arrangement for carrying out my process.

Figure 2 is a transverse vertical section of the open evaporating brine tank employed in the arrangement.

Figure 3 is a fragmentary longitudinal section of a portion of the tank showing the construction of the piping for withdrawing brine from the tank.

Figure 4 is a plan view of the open brine tank.

Referring more particularly to the drawings, 10 designates a steam turbine which may be of the Allis-Chalmers type connected by means of a pipe 11 with a surface condenser 12. This condenser is connected with a vacuum pump 13 which is connected by means of a pipe 14 with the surface condenser and a baffle 15 prevents the loss of steam from the condenser. A pipe 16 connects the surface condenser with a preheater 17 while a pipe 18 is connected with the boiler which creates steam for the turbine 10 so that water at approximately 212° F. is returned to the boiler for further production of steam.

The surface condenser is provided with heads 19 and 20. A conduit 21 connects the head 19 with a spray manifold 22. The latter, upon opposite sides of its connection with the conduit 21 is gradually reduced in diameter towards its outer free ends which provides for an equalization of the pressure when brines or solutions are forced through the nozzles 23 of the spray arms 24 so that all of the nozzles 23 will be operated under the same pressure and force the solution from said nozzles in a mist to the same height over the level 25 of the liquid in the open tank 26.

A branch pipe 27 is connected with the supply pipe 21 and supplies heated brine to another spray manifold 28 which extends longitudinally of a square flat pond or open tank 29. This tank has a plurality of spray nozzles 30 connected with arms 31, with the arms placed in groups and provided at spaced intervals along the manifold 28. This manifold is likewise decreased in diameter from opposite sides of the connections 32 so that all of the nozzles will be supplied with a predetermined pressure and that the mist coming from said nozzles will be projected from the same at substantially the same angle and to substantially the same distance from said nozzles. A return pipe 33 is connected by means of a pipe 34 with a tank 26 and by means of a pipe 35 with tank 29. A valve 36 controls the discharge through pipe 35 while a valve 37 controls the admission of brine to the tank 29. A valve 38 controls the flow of the brine solution to the tank 26.

Figure 3:
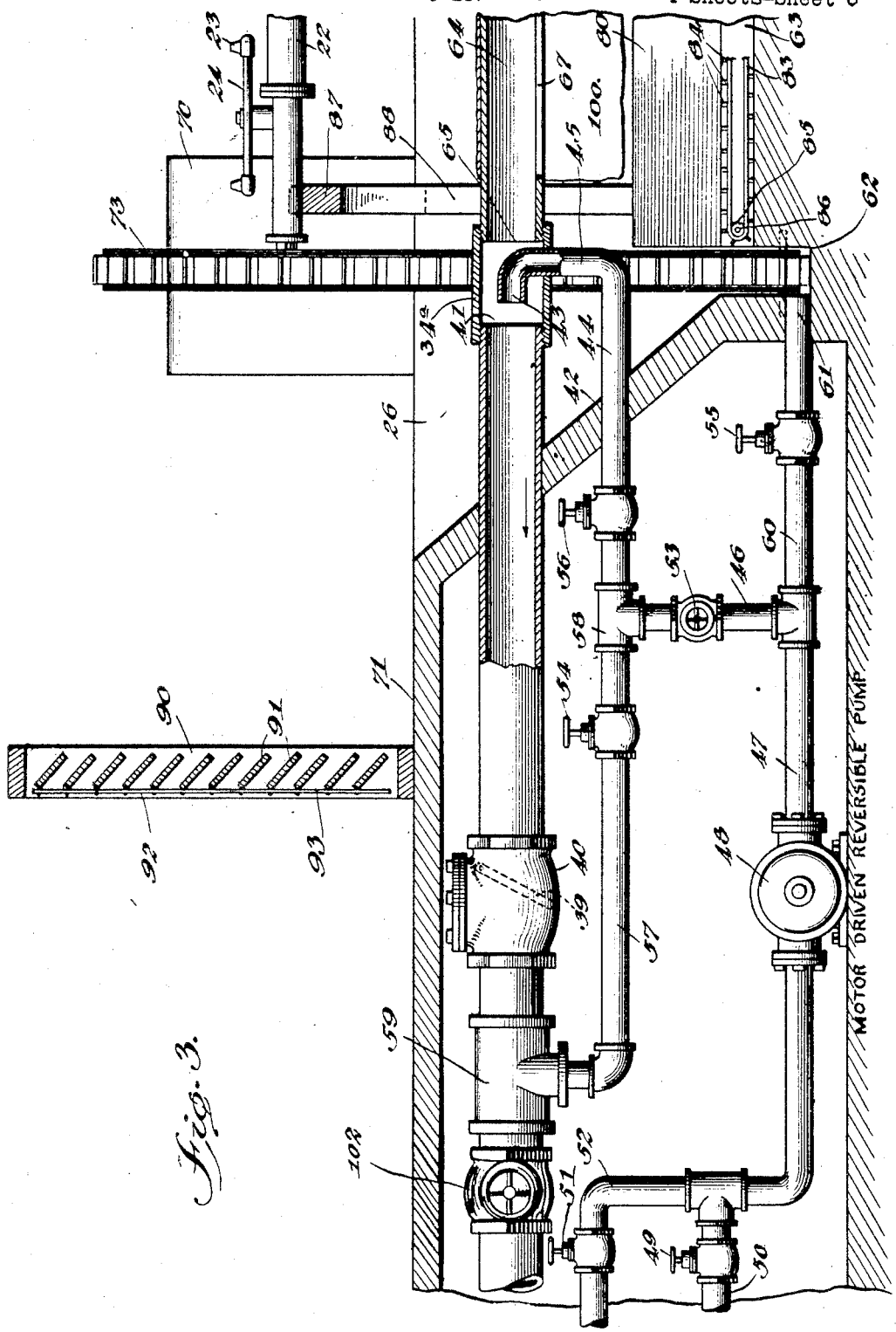

The pipe 34 has a check valve 39 formed in a casing 40, which permits the flow of liquid of the brine from the tank 26 to the condenser 12 but prevents the return of the brine to said tank. It will be seen from Figure 3 that pipe 34 terminates at 41 adjacent the inclined end wall 42 of the tank. Adjacent the end 41 of the pipe 34 is disposed an open end 43 of a pipe 44. This pipe is turned upwardly as shown at 45 and is connected by means of a pipe 46 with a pipe 47. A motor driven reversible pump 48 is interposed in the line 47 for the purpose which will be presently explained. However, when the valve 49 in the supply pipe 50 is closed and valve 51 in pipe 52 is opened the pump may force brine intermittently or continuously through pipe 47, pipe 46 and pipe 44 into the pipe 34. At this time valves 54 and 55 are closed while valve 56 is open.

A pipe 57 is connected at one end with a T 58, while the other end is connected to a T 59 of the pipe 34 so that fresh brine from pipe 52 or water from pipe 50 may be supplied directly to pipe 34 upon one side of the valve 39. The pipe line 57 and the check valve 39 permit priming of the system.

A pipe 60 has an end 61 terminating within the wall 42 of the tank 26 and at the bottom of a transverse channel 62 formed at one end of the tank 26 and below the level of the channels 63 which extend longitudinally of the tank.

A pipe 64 extends substantially the entire length of the tank 26 and has one end in communication with pipe 34 and the other end, as shown at 66, closed. A slit 67 extends substantially the length of the pipe 64 and the brine or solution in the tank 26 is drawn through the slitted portion by the suction in the pipe 34. The connection 34ª between pipes 34 and 64 is provided with an opening into which the bent portion 45 is inserted so that the open end or nozzle portion 43 is directed towards the pipe 34. The pipe 34 and pipe 64 may be a single pipe.

The channel 62 extends not only transversely of the tank 26 but upwardly through a side wall 68 as shown at 69 which is extended at 70 above a floor space 71 which embraces the periphery of the upper open end of the tank 26. The upper free end of the extension 70 is turned downwardly as shown at 72 so that the crystals which are carried up by the travelling carrier 73 through the blades 74 are deposited upon the slides 72 whence the crystals may be collected. The carrier 73 extends longitudinally of the transverse channel 62 and also of the channel 69. A sprocket 75 mounted in the inner end of the channel 62 supports the carrier at that point. Sprockets 76 and 77 maintain the carrier in proper position while a sprocket 78 disposed at any point above the floor 71 not only serves to support the carrier at this point but also drives the carrier.

The bottom of the tank 26 may be provided with a single longitudinal groove or a plurality of parallel longitudinal grooves 63 separated by walls 80 which are triangular shaped in cross section, these walls having their sides 81 inclined as are the side walls 82 of the tank 26. In each of the longitudinal grooves 63 are disposed travelling carriers 83 having fins or scrapers 84 which drag across the bottom of the groove and are supported by sprockets 85 at the opposite ends of said grooves. The sprockets 85 are positively driven and are all placed upon the same shaft 86 which is in turn driven through a chain (not shown) and connected with the driving mechanism of the sprocket 78 so that all of the travelling carriers are driven synchronously. As the travelling carriers 83 are operated in the grooves 63 all crystallized substances are forced from the grooves 63 into the channel 62 whence the travelling carrier 73 carries the crystals outwardly and deposits them upon the discharging shelf 72.

Figure 2:
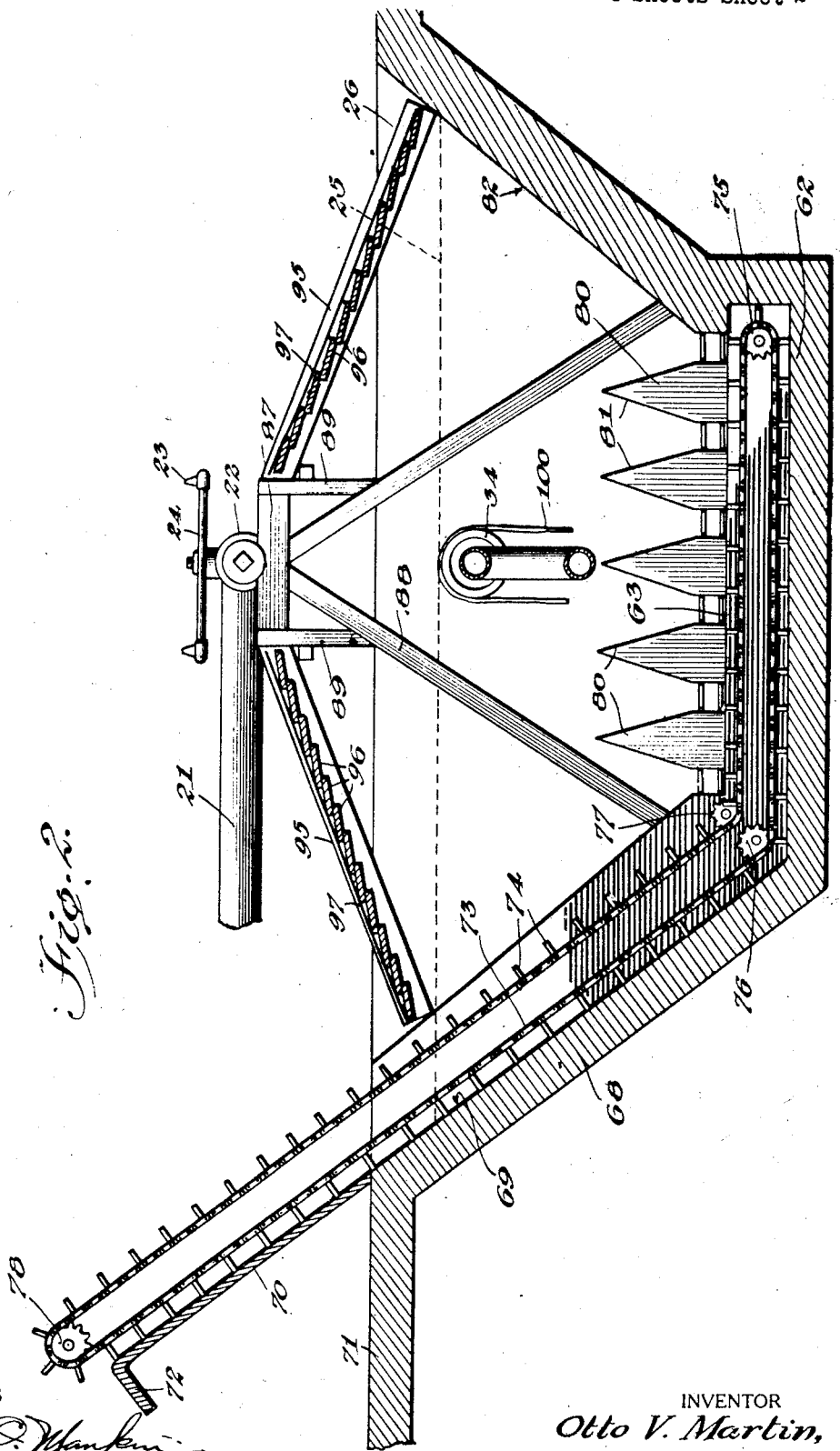

The manifolds 22 and 28 are supported by means of an arrangement shown in end view in Figure 2 in which a plurality of transverse bars 87 are carried in any suitable manner, for example, by diagonally disposed standards, the latter being braced by cleats 89 secured to the ends of the bars 87 and to the standards 88. The lower ends of the standards are secured in the side walls 82 of the tank 26. The bars 87 may be grooved properly to support the respective manifolds.

Since the brines or solutions are sprayed to the open air it is necessary to control natural wind currents which will not only affect the deposition of the spray over the pond but will also affect the rate of evaporation. In order to accomplish this control I have provided a plurality of frames 90 arranged along one side of the tank 26 and supported on the floor or platform 71 or the frames may be arranged entirely around the periphery of said tank. In each of the frames is disposed a plurality of movable shutters or slats 91 which are connected together by means of cables or rods 92 for operating the shutters so that the openings between the same may be increased or decreased. Means is provided (not shown) for maintaining the shutters in adjusted position. Each of the shutters is pivotally mounted for rocking movement in the side bars 93 of the frames.

A plurality of frames 95 are disposed above the normal liquid level in the evaporating tank 26, being supported preferably in downwardly inclined positions on both sides of the manifold 22. These frames include a plurality of pivotally mounted slats 96 which are connected together by a cord or cable 97 so that the slats may be arranged in any angular relation with respect to the horizontal for checking the fall of the spray as it issues from the nozzles 23. It will be noted that the slats 96 are arranged in an overlapping stair-step or cascade effect so that the mist starting at the uppermost slat will travel downwardly from slat to slat and is finally discharged into the tank along the side walls. This aids in maintaining the surface of the liquid in the tank free from agitation whereby the larger crystals are formed. By the alteration of the position of the slats, the cascade effect of the progression of the brine will be changed into a series of short discharges of the brine from each individual slat or the slats may be so positioned that the mist will fall directly through the slats upon the surface of the liquid so that the amount of agitation caused by the falling of the brine may be controlled to any degree desired, with a consequent control of the size of the crystals.

An apron 100 of suitable fabric or the like is draped over the pipe 34 upon opposite sides of the slit 67 so that this pipe may be protected from the path of travel of the settling crystals and prevent the formation of the crystals along the pipe and thus prevent the clogging of the pipe and the slit 67.

In carrying out my process of obtaining crystals the tank 26 is filled with a predetermined quantity of a solution or brine through the supply pipe 52 and pipe 47 and the solution may be fed into the tank either by gravity or by means of a pump 48 which is operated by an electric motor or any other form of motor suitable for the purpose. At this time valves 49 and 53 are closed, while valve 55 is open. A predetermined level of brine is maintained in the tank 26 for controlling the size of the crystals which are formed by the concentration or saturation of the brine. The pump 94 is then operated and may be driven through operative connections with the steam turbine or by means of a motor from the current of the power house in which the steam turbine is located for operating the generator. This pump promotes the circulation of the brine or solution between the tank 26 and the surface condenser 12. The pump creates a suction on pipe 34 and the brine flows through the open end 41 of said pipe and where said pipe projects into the tank 26. The flow of brine through the end 41 of pipe 34 causes the brine in pipe 64 to likewise move past the open end 65 of pipe 64 with the fluid passing through the slit 67 of said pipe. In order to prevent the formation of crystals in the pipes 34 the valves 55, 54 and 49 are maintained closed and valves 51, 53 and 56 are opened and the pump 48 is operated so that the solution or brine is pumped through pipe 44, 45 and through the open end 43 and into the pipe 41. This unsaturated brine passing through the pipe dissolves or prevents the formation of crystals all along the line and through pipe 34, 33 and through the surface condenser 12 and pipe 21 back to pipe 22. The check valve 39 in the casing 40 permits the discharge of the fluid from the tank 26 but prevents its return.

As the fluids pass through the surface condenser 12 which is connected with the steam turbine the solutions absorb heat while passing through the condenser so that the temperature of the brine or solution is raised slightly above atmospheric temperature and under normal conditions this may be approximately 10 to 15 degrees. It will be appreciated, however, that due to variations of the temperature at different seasons of the year the rise in temperature above atmosphere will be considerably greater than 10 or 15 degrees. It will be appreciated that the raising of the temperature of water from approximately 80° F. to 212° F. will require 122 B. t. u.'s while in converting the water to steam and in which it is necessary to overcome the cohesion of the molecules, and external pressure, 970 B. t. u.'s or the heat of vaporization is required. It will be seen that a greater percentage of heat units is required in converting the water at 212° to steam at 212°. However, only 158 B. t. u.'s are required for raising the temperature of the steam 158°. A careful consideration of this condition reveals the fact that 280 B. t. u.'s only are required to raise the temperature of the fluid from 80° to 370° while 970 B. t. u.'s are required for converting the water into steam at the same temperature.

It is an important feature of the present invention that the enormous quantity of B. t. u.'s which represent the latent heat of the steam is utilized for raising the temperature of the brine a predetermined degree so that when the brine is sprayed as a mist into the atmosphere condensation and evaporation take place at a very rapid rate so that the brine is rapidly concentrated until it reaches saturation when crystals will be formed. Furthermore a vacuum is drawn on the condenser so that the pressure within the condenser is approximately zero absolute. This negative pressure aids in preventing the lowering of the temperature of the condensate so that no energy is wasted by overcoming external pressure. As the brine passes through the surface condenser it is heated and the brine is then pumped to pipe 22 which is forced through the arms 24 and through the spray nozzles 23 in the form of a mist, where rapid evaporation takes place before the liquids reach the level of the liquid in the tank 26. It will be appreciated that this rapid evaporation, due to the enormous quantities of heat units that it absorbs from the condensate, takes place far below the boiling points of the liquids and at atmospheric pressure.

In a power plant which is associated with the tank described approximately 230,000 feet of gas per hour produces 160,000 pounds of steam and 10,000 K. W. of power. Of the total of 230,000,000 B. t. u.'s generated in the furnaces 36,000,000 are transformed into power; 34,000,000 are lost by radiation, etc., and 160,000,000 B. t. u.'s are dissipated in the spray pond at considerable expense, the last B. t. u.'s being otherwise dissipated to the atmosphere in the spray pond for the concentration of the salt brines and from which it will be noted that an enormous saving of energy is had. This latent heat which is ordinarily wasted, is utilized in the manufacture of salt or for the concentration of brines which are obtained in large quantities from any source, but which are largely obtained in the oil regions from the salt water which is pumped with the oil in the oil wells.

This brine is collected and then carried to the spray pond or tank 26 and contains sodium chloride, magnesium and calcium chlorides. When the concentration of the brine becomes sufficient, crystals of sodium chloride form and are removed by the drag scrapers 63 and 73 which are operated simultaneously.

After the bittern reaches a concentration of about 40% magnesium and calcium chloride, all salt has been deposited and the bittern is removed for further treatment by standard methods to separate the magnesium from the calcium.

By properly regulating the rate of flow of a fresh charge of brine through pipe 44 to the discharge pipe 34 not only the level of the liquid in the tank 26 may be maintained constant for controlling the size of the crystals, but the accumulation of crystals in the discharge line pipe 34 and the return pipe 21 will be prevented. By varying the level of the brine in the tank the size of the crystals is controlled since a higher level of brine permits the crystals to travel a greater distance through the brine with a consequent enlargement of the crystals and vice versa.

What I claim is:

1. A continuous process for recovering salts from a solution which comprises passing the solution in heat inter-changing relationship with a fluid being condensed while maintaining a pressure of approximately zero absolute on the fluid so that latent heat freed from said fluid upon condensing will be utilized to increase the temperature of the solution but slightly above atmospheric temperature, converting the heated solution into a mist, in the atmosphere over a body of the solution, thereby warming the atmosphere with which the spray comes into intimate contact, keeping the atmosphere above its dew point thereby effecting continuous and rapid evaporation of moisture from said solution throughout the range of travel of said mist from the point at which it emanates to the surface of the body of the liquid into which it falls.

2. A continuous process for recovering salts from a solution which comprises heating the solution, converting the heated solution into a mist in the atmosphere over a body of the solution, thereby warming the atmosphere with which the spray comes into intimate contact, keeping the atmosphere above its dew point thereby effecting continuous and rapid evaporation of moisture from said solution throughout the range of travel of said mist from the point at which it emanates to the surface of the body of the liquid into which it falls.

3. A continuous process for recovering salts from a solution which comprises passing the solution in heat interchanging relationship with a fluid being condensed, thereby utilizing the latent heat freed from said fluid upon condensing to increase the temperature of the brine to approximately the temperature of the condensate, converting the heated solution into a mist in the atmosphere over a body of the solution, thereby warming the atmosphere with which the spray comes into intimate contact, keeping the atmosphere above its dew point thereby effecting a continuous and rapid evaporation of moisture from said solution throughout the range of travel of said mist from the point at which it emanates to the surface of the body of the solution into which it falls, returning the concentrated brine from the body of the liquid to heat exchanging relation with the fluid while adding a fresh charge of brine to the concentrated brine during the passage of said brine to heat exchanging relation with the fluid for dissolving of salt crystals along the path of the brine and for maintaining a predetermined level of the body of the solution.

4. A continuous process for recovering salts from a solution which comprises heating the solution, converting the heated solution into a mist in the atmosphere over a body of the solution, thereby warming the atmosphere with which the spray comes into intimate contact, keeping the atmosphere above its dew point thereby effecting continuous and rapid evaporation of moisture from said solution and interrupting the fall of the brine after misting for checking the velocity of the mist to control the size of the crystals formed.

5. A continuous process for recovering salt from brine which comprises heating the brine, converting the heated brine into a mist over a body of the solution, exposed to the atmosphere, thereby reducing the temperature of the brine to approximately the dew point so that moisture is removed between points where the mist is created and the level of the brine body with the consequent concentration of the brine, spreading the brine after misting over a surface above the level of the body of the brine and varying the angular position of the surface for regulating the size of the crystals formed.

6. A continuous process for recovering salts from a solution which comprises passing the solution in heat interchanging relationship with a fluid being condensed in a surface condenser, thereby utilizing the latent heat freed from said fluid upon condensing to increase the temperature of the solution to approximately the temperature of the condensate, converting the heated solution into a mist in the atmosphere above a body of the solution, keeping the atmosphere above its dew point thereby effecting the continuous and rapid evaporation of moisture from said solution throughout the range of travel of said mist from the point at which it emanates to the surface of the body of the solution into which it falls, interrupting the fall of the brine after misting for controlling the size of the crystals formed in the body of the solution and then removing the crystals formed at points along the center of the body of the solution.

7. A continuous process for recovering salts from a solution which comprises heating the solution, converting the heated solution into a mist in the atmosphere over a body of the solution, thereby warming the atmosphere with which the mist comes into intimate contact, keeping the atmosphere above its dew point thereby effecting continuous and rapid evaporation of moisture from said solution throughout the range of travel of said mist from the point at which it emanates to the surface of the body of the solution into which it falls, and directing the crystals formed by the concentration of the brine in the body of the solution along lines running longitudinally of the body of the solution.

8. A continuous process for recovering salts from a brine solution which comprises passing the solution in heat interchanging relationship with a fluid being condensed while maintaining the pressure on the fluid at approximately zero absolute scale so that the latent heat freed from said fluid upon condensing will be utilized to increase the temperature of the brine to approximately the temperature of the condensate, converting the heated solution into a mist, in the atmosphere over a body of the solution thereby warming the atmosphere with which the spray comes into intimate contact, keeping the atmosphere above its dew point thereby effecting continuous and rapid evaporation of moisture from said solution throughout the range of travel of said mist from the point at which it emanates to the surface of the body of the solution into which it falls, returning the concentrated brine to heat exchanging relation with the fluid for the absorption of heat while adding a limited charge of weaker brine to the concentrated brine during the return of the concentrated brine for causing the dissolving of salt crystals along the path of the brine and for maintaining a predetermined level of solution in the body.

9. A continuous process for recovering salts from a solution which comprises heating the solution, converting the heated solution into a mist in the atmosphere over a body of the solution, thereby warming the atmosphere with which the spray comes into intimate contact, keeping the atmosphere above its dew point thereby effecting continuous and rapid evaporation of moisture from said solution throughout the range of travel of said mist from the point at which it emanates to the surface of the body of the solution into which it falls, withdrawing the concentrated brine from the tank in a continuous thin sheet, heating the withdrawn brine then returning the heated brine in a mist above the surface of the body of the solution.

10. A continuous process for recovering salt from brine which comprises heating the brine, converting the heated brine into a mist over a body of the brine exposed to the atmosphere thereby reducing the temperature of the brine to approximately the dew point so that moisture is removed between the points where the mist is created and the level of the body of the brine with the consequent concentration of the brine, withdrawing the concentrated brine from the tank in a continuous thin sheet, adding a limited charge of unconcentrated brine to the withdrawn brine, heating the withdrawn brine and misting the heated brine over the body of the brine.

11. A continuous process for recovering salt from brine which comprises heating the brine, converting the heated brine into a mist over a body of brine exposed to the atmosphere thereby reducing the temperature of the misted brine to approximately the dew point so that moisture is removed between points where the mist is created and the level of the brine in the body of said brine with the consequent concentration of the brine and controlling the size and shape of the granules of salt which are formed in the body of the brine by varying the path of the fall of the mist to the body of the brine.

12. A continuous process for recovering salt from brine which comprises heating the brine, converting the heated brine into a mist over a body of the brine exposed to the atmosphere thereby reducing the temperature of the misted brine to approximately the dew point so that moisture is removed between points where the mist is created and the level of the brine with the consequent concentration of the brine, controlling the size of the crystals of the salt by regulating the depth of the body of the brine by a charge of fresh brine admitted to the body of the brine.

13. A continuous process for recovering salt from brine which comprises maintaining a fluid adapted to be condensed with the pressure on said fluid being approximately zero absolute scale, passing the brine as a cooling agent in heat exchanging relation with the fluid and utilizing the latent heat freed from the fluid for raising the temperature of the brine, spraying the heated brine in the form of a mist over a body of the brine while exposing the mist to the atmosphere so that a predetermined quantity of the moisture is eliminated and the brine is thus concentrated with a consequent lowering of the temperature of said brine.

14. A continuous process for recovering salts from a brine which comprises heating the brine slightly above atmospheric temperature, converting the heated brine into a mist over a body of the brine exposed to the atmosphere, thereby reducing the temperature of the brine to approximately the dew point with the consequent evaporation of part of the water of the brine, withdrawing the concentrated brine from the body of the brine while adding a fresh charge of brine to the withdrawn brine for regulating the level of the brine in the body of the brine, heating the mixture of the withdrawn brine and the fresh charge of brine, then misting the heated brine over the body of the brine, the addition of a charge of unconcentrated brine preventing the formation of crystals during withdrawal of the brine from the body of the brine.

15. In a process for recovering salts from a solution, the steps which comprise heating the solution above the dew point temperature of the atmosphere, converting the heated solution into a mist in the atmosphere over a body of the solution and keeping the atmosphere above its dew point by controlling the amount of air coming into contact with the mist to insure rapid evaporation of moisture from the solution throughout the range of travel of said mist from the point at which it emanates to the surface of the body of the solution into which it falls.

16. In a process for recovering salts from a solution, the steps which comprise passing the solution in heat-interchanging relationship with a fluid being condensed so that normally wasted heat freed from said fluid upon condensing will be utilized to increase the temperature of the solution above atmospheric dew point temperature, converting the heated solution into finely divided spray form in the atmosphere over a body of the solution, thereby warming the atmosphere with which the spray comes into intimate contact, controlling the temperature of the heated brine and the supply of air coming into contact with said spray to keep said air above its dew point, thereby effecting rapid and continuous evaporation of moisture from said solution throughout the range of travel of said spray from the point at which it emanates to the surface of the body of the solution into which it falls.

17. In a process for recovering a salt from a solution thereof, the steps which comprise passing a less than saturated solution of the salt in heat-interchanging relationship with a fluid being condensed, whereby normally waste latent heat freed from said fluid will be utilized to increase the temperature of the solution above the dew point temperature of the atmosphere, discharging the heated solution at a point above the body of the solution in such a manner as to expose a large surface area of the discharge solution to evaporation in the atmosphere and controlling the amount of atmospheric air coming into contact with the discharged solution and the temperature of said heated solution to keep the temperature of said air above its dew point, thereby effecting rapid and continuous evaporation of moisture from said solution throughout the range of travel of said solution from its point of discharge to the surface of the body of the solution into which it falls.

OTTO V. MARTIN.